United States Patent
Steinwandel et al.

(10) Patent No.: US 9,350,037 B2
(45) Date of Patent: May 24, 2016

(54) METHOD FOR MANUFACTURING A SOLID OXIDE FUEL CELL ELEMENT BY LAYER-WISE BUILDUP AND SOLID OXIDE FUEL CELL ELEMENT

(71) Applicant: Airbus Operations GmbH, Hamburg (DE)

(72) Inventors: Jürgen Steinwandel, Uhldingen-Mühlhofen (DE); Christian Wolff, Ottobrunn (DE); Claus Hoffjann, Hamburg (DE)

(73) Assignee: Airbus Operations GmbH (DE)

( * ) Notice: Subject to any disclaimer, the term of this patent is extended or adjusted under 35 U.S.C. 154(b) by 268 days.

(21) Appl. No.: 14/058,926

(22) Filed: Oct. 21, 2013

(65) Prior Publication Data

US 2014/0051014 A1  Feb. 20, 2014

Related U.S. Application Data

(63) Continuation of application No. PCT/EP2012/057235, filed on Apr. 20, 2012.

(60) Provisional application No. 61/504,368, filed on Jul. 5, 2011, provisional application No. 61/477,703, filed on Apr. 21, 2011.

(30) Foreign Application Priority Data

Jul. 5, 2011 (DE) .......................... 10 2011 106 654

(51) Int. Cl.
  H01M 8/1253 (2016.01)
  H01M 8/243 (2016.01)
  (Continued)

(52) U.S. Cl.
  CPC ............ *H01M 8/1097* (2013.01); *B28B 1/001* (2013.01); *C04B 35/016* (2013.01);
  (Continued)

(58) Field of Classification Search
  CPC ...... H01M 8/243; H01M 8/124; H01M 8/004
  USPC .................................................... 429/497, 535
  See application file for complete search history.

(56) References Cited

U.S. PATENT DOCUMENTS 5,431,967 A   7/1995 Manthiram et al.
5,693,201 A  12/1997 Hsu et al.
(Continued)

FOREIGN PATENT DOCUMENTS

CN  1162368 A  10/1997
CN  1423034 A   6/2003
(Continued)

OTHER PUBLICATIONS

Chinese Office Action dated Apr. 29, 2015.
(Continued)

*Primary Examiner* — James Lee
(74) *Attorney, Agent, or Firm* — Lerner, David, Littenberg, Krumholz & Mentlik, LLP (57) ABSTRACT

A method for manufacturing a solid oxide fuel cell element by layer-wise buildup wherein at least one section of the element is built up by carrying out a step that at least includes the following at least once: applying a layer section of a particulate ceramic material with predefined dimensions onto a base layer in a predefined area and heating the layer section by means of a heat source such that the particles of the ceramic material connect to one another within the predefined dimensions. The solid oxide fuel cell element manufactured with the method is realized in one piece, as well as highly compact, and has a low weight.

20 Claims, 3 Drawing Sheets

(51) Int. Cl.
  *H01M 8/10* (2016.01)
  *H01M 4/88* (2006.01)
  *H01M 4/90* (2006.01)
  *H01M 8/12* (2016.01)
  *H01M 8/24* (2016.01)
  *C04B 35/01* (2006.01)
  *C04B 35/486* (2006.01)
  *B28B 1/00* (2006.01)

(52) U.S. Cl.
  CPC .......... *C04B 35/486* (2013.01); *H01M 4/8889* (2013.01); *H01M 4/9033* (2013.01); *H01M 4/9066* (2013.01); *H01M 8/1253* (2013.01); *H01M 8/2425* (2013.01); *C04B 2235/3213* (2013.01); *C04B 2235/3225* (2013.01); *C04B 2235/3227* (2013.01); *C04B 2235/405* (2013.01); *C04B 2235/665* (2013.01); *H01M 2008/1293* (2013.01); *Y02E 60/521* (2013.01); *Y02E 60/525* (2013.01); *Y02P 70/56* (2015.11)

(56) References Cited

U.S. PATENT DOCUMENTS

| | | |
|---|---|---|
| 6,492,050 B1 | 12/2002 | Sammes |
| 7,153,599 B2 | 12/2006 | Bunker et al. |
| 8,282,989 B2 | 10/2012 | Coulon et al. |
| 2003/0134169 A1* | 7/2003 | Sarkar et al. .................... 429/31 |
| 2003/0235738 A1 | 12/2003 | Zheng |
| 2004/0040312 A1 | 3/2004 | Hoffjann et al. |
| 2006/0029849 A1 | 2/2006 | Metzler |
| 2007/0243444 A1 | 10/2007 | Zheng et al. |
| 2008/0008826 A1 | 1/2008 | Coulon et al. |
| 2011/0065019 A1 | 3/2011 | Taniguchi |

FOREIGN PATENT DOCUMENTS

| | | |
|---|---|---|
| CN | 1514507 A | 7/2004 |
| CN | 1729589 A | 2/2006 |
| CN | 101088190 A | 12/2007 |
| DE | 10 216 710 A1 | 4/2003 |
| DE | 102 49 588 A1 | 5/2004 |
| DE | 10 2004 034 870 B4 | 8/2007 |
| DE | 10 2011 018 448 A1 | 10/2012 |
| GB | 2 469 043 A | 10/2010 |
| JP | 04-055364 A | 2/1992 |
| JP | 2-798281 B2 | 9/1998 |
| JP | 4055364 B2 | 3/2008 |
| WO | 96/05625 A2 | 2/1996 |
| WO | 99/19161 A1 | 4/1999 |
| WO | 2004004039 A1 | 1/2004 |

OTHER PUBLICATIONS

Chinese Office Action dated May 21, 2015.

* cited by examiner

METHOD FOR MANUFACTURING A SOLID OXIDE FUEL CELL ELEMENT BY LAYER-WISE BUILDUP AND SOLID OXIDE FUEL CELL ELEMENT

CROSS-REFERENCE TO RELATED APPLICATIONS

The present application is a continuation of International Patent Application PCT/EP2012/057235, filed Apr. 20, 2012, which claims priority from German Patent Application No. 10 2011 106 654.7 filed Jul. 5, 2011, and which claims the benefit of the filing dates of U.S. Provisional Patent Application No. 61/504,368 filed Jul. 5, 2011 and U.S. Provisional Patent Application No. 61/477,703 filed Apr. 21, 2011, the disclosures of which are hereby incorporated herein by reference.

TECHNICAL FIELD

The invention relates to a method for manufacturing a solid oxide fuel cell element by layer-wise buildup. The invention furthermore relates to a solid oxide fuel cell element.

BACKGROUND OF THE INVENTION

Nowadays, one of the most important endeavors in the design of drive units for different purposes is the minimization of the demand for fuel in order to ensure the most effective and non-polluting operation possible of the drive unit. Depending on the respective purpose, however, the primary objective may also be a weight reduction, e.g., when the drive units are used in vehicles and, in particular, aircraft. In order to optimize the fuel demand in aircraft, it is currently common practice to utilize fuel cell systems for generating electrical power and thusly reducing the mechanical power to be generated by the main engines, part of which is used for driving electric generators.

The German patent application with file number DE 10 2011 018 448.1 describes a particularly advantageous drive unit, in which a highly compact integration and coupling of a fuel cell device and a combustion chamber is realized directly within an internal combustion engine. A fuel-air mixture flows through solid oxide fuel cells such that a fuel cell process is initiated within the fuel cells. The fuel-air mixture flowing through the fuel cells is only partially utilized in the fuel cell process. The unconsumed fuel-air mixture flows into a downstream combustion chamber in order to conventionally generate mechanical power.

BRIEF SUMMARY OF THE INVENTION

In order to further compact and thusly additionally reduce the weight of an integrated unit consisting of a fuel cell and an internal combustion engine, it appears sensible to optimize the shape and the arrangement of solid oxide fuel cells. An aspect of the invention therefore proposes a method, by means of which a solid oxide fuel cell element with the largest usable surface possible for the fuel cell process can be manufactured in order to maximize the power within the smallest space possible. Another aspect proposes a solid oxide fuel cell element that not only has the most compact shape possible, but also the largest usable surface possible.

At this point, the design of an aforementioned drive unit is described in order to elucidate the function of the solid oxide fuel cell element according to an embodiment of the invention. This drive unit comprises a combustion chamber for the combustion of a fuel-air mixture, wherein the combustion chamber comprises a combustion chamber inlet for supplying a fuel-air mixture and a combustion chamber outlet for discharging waste gas, and at least one solid oxide fuel cell element that comprises at least one fuel cell with an anode that can be coupled to a supply line for anode fuel and a cathode that can be coupled to an air source, wherein the fuel cell comprises a fluid outlet that is connected to the combustion chamber inlet. Consequently, the combustion chamber is arranged downstream of the at least one fuel cell referred to a flow direction that is defined by the flow of the fuels such that the cathode/anode gas mixture exiting the at least one fuel cell can flow through the combustion chamber. One quintessential aspect of this drive unit therefore can be seen in the particularly advantageous direct and highly compact integration and coupling of a solid oxide fuel cell element with a combustion chamber directly within an internal combustion engine, in which an air flow that originates from an air source and is required for the function of the internal combustion engine initially flows through the solid oxide fuel cell element. With respect to the fuel cell process, this air flow therefore is also referred to as "cathode air flow" below, wherein this cathode air flow leads to the generation of electrical power with the aid of fuel supplied to the anode.

A special feature can be seen in that, after the partial consumption of oxygen from the cathode air flow, i.e., the reduction of the oxygen on the cathode and the partial oxidation of fuel on the anode during the operation of the fuel cell, the remaining cathode air flow and the remaining fuel mass flow exit the solid oxide fuel cell element through the fuel cell outlet and are directly introduced into the combustion chamber inlet of the combustion chamber. At this location, the remaining (gaseous) fuel preferably is completely burned and the waste gas is discharged outward through the combustion chamber outlet. Since the cathode air flow is directly routed into the combustion chamber without passing through heat exchangers or lines for bridging spatial distances, the heat and the increased pressure resulting from the generation of electrical power within the solid oxide fuel cell element are available for generating mechanical power. Due to the combustion in the combustion chamber, the unconsumed components of the fuel result in a further pressure increase and additional heating. The overall pressure reached within the combustion chamber is subsequently available for generating mechanical power, namely either in the form of rotatory mechanical power or thrust power in conventional drive units. In order to achieve a particularly efficient operation, it goes without saying that it should be attempted to realize a complete combustion by controlling the supply of fuel to the at least one fuel cell accordingly.

The structural space available for the solid oxide fuel cell element therefore may preferably have the shape of a hollow cylinder because a shaft extending between a compressor and a turbine needs to be able to extend through the solid oxide fuel cell element such that the latter needs to provide a corresponding shaft tunnel or another suitable hollow space.

In the method according to an aspect of the invention, a layer-wise buildup is carried out, wherein at least one section of a solid oxide fuel cell element is built up by carrying out a step that at least comprises the following at least once: applying a layer section of a particulate ceramic material with predefined dimensions onto a base layer in a predefined area and heating the layer section by means of a heat source such that the particles of the ceramic material connect to one another within the predefined dimensions.

In other words, an agglomeration of particles of a ceramic material in the form of a thin layer is locally produced on a base layer in a predefined area. The particles connect to one another due to local or full-surface heating of this agglomerated layer and form a mechanically coherent solid layer. If so required, this process can be repeated once or several times on the finished layer in order to manufacture a component, in this case a solid oxide fuel cell element, of several individually contoured and hardened layers. This generative manufacturing method is known as "ALM" ("Additive Layer Manufacturing"), but primarily used in connection with metal and plastic particles in the prior art.

The smallest base area possible of the layer section, i.e., the finest manufacturable structure, particularly depends on the geometric shape of the heat source. When using a laser as heat source, the smallest manufacturable structure depends on the size of the light spot or beam spot, wherein the particle size of the ceramic material used may also influence the attainable fineness of structure.

This layer-wise buildup allows a design of the solid oxide fuel cell element that completely differs from a radially distributed arrangement of tubular solid oxide fuel cells. In order to realize an arrangement of solid oxide fuel cells around an engine shaft, the available structural space in the shape of a hollow cylinder can be utilized particularly well if the solid oxide fuel cell element consists of a single piece. Consequently, it is possible to realize fuel cells with the shape of a ring or ring segment, a concentric arrangement of several fuel cells with the shape of a ring or ring segment and an axial distribution of concentric arrangements of several fuel cells with the shape of a ring or ring segment. Due to the application of layer sections and the heating of the individual layer sections, practically any shape can be manufactured of a ceramic material that may also comprise undercuts and have generally complex shapes without joints, in particular, with respect to an optimization of the space requirement and the available surface. The single-piece solid oxide fuel cell element may also have a lower weight, but nevertheless a larger surface than a radially distributed arrangement of individual tubular cells.

Several options basically exist for carrying out a method according to an aspect of the invention of this type. The application of the layer section onto the base layer may comprise one of the following steps 1) or 2) that respectively comprise: 1) providing a powder bed of ceramic particles on the base layer and sintering the particles in a section of the powder bed with predefined dimensions by means of a heat source such that the particles connect to one another within the predefined dimensions, as well as subsequent cooling; 2) supplying ceramic particles onto a predefined area of the base layer by means of one or more nozzles and sintering the particles by means of a heat source such that the particles connect to one another within the predefined dimensions, as well as subsequent cooling.

These procedures primarily differ with respect to the time sequence of the application and the sintering. When using a powder bed that is applied onto the base layer, for example, over its entire surface by means of nozzles or other dispensing devices and subsequently measured out with doctor blades, spatulas or other devices, all the material to be used is already present in its entirety before the heat source is activated. A suitable heat source passes over part of the powder bed in accordance with the specifications of a control device and thusly can locally heat the powder such that the ceramic particles connect to one another along desired contours and surfaces. All areas of the powder bed that are not acted upon by the heat source remain powdery and can be removed from the progressively developing solid oxide fuel cell element within regular intervals or after the completion of the manufacturing process.

In an alternative approach, the particulate ceramic material is locally applied along the desired contours and surfaces successively in a layer plane and solidified subsequently or immediately after the application by locally acting thereupon with heat from the heat source. In this case, the removal of unneeded particles is eliminated, wherein this is particularly advantageous if the ratio of the geometric surface of the hardened layer to the base layer is very small.

In an advantageous embodiment of the invention, at least one additional layer section of the particulate ceramic material is applied onto the base layer that comprises a previously applied layer section. The buildup in layers is ensured due to the successive arrangement of several layers and a respective hardening or heat treatment, wherein it is also possible to manufacture finely structured components. The particles of the ceramic material connect to the layer that lies underneath the particles during the sintering process, wherein the temperature and the time of exposure of the heat source depend, in particular, on the chosen particulate material.

In an advantageous embodiment of the invention, the heat source is movable and the application of a layer section is carried out under continuous or pulsating power output of the heat source until a predefined dimension of the layer section is reached. In this case, the heat source does not have to extend over the entire periphery of the solid oxide fuel cell element, but rather may be realized such that it can treat surfaces of practically any size with the aid of a suitable bearing arrangement, a guide and a suitable drive. A certain speed of the sintering process can be achieved in dependence on the power of the heat source that is realized, e.g., in the form of a laser. The wavelengths of the laser preferably lie in the wavelength ranges that are sufficiently absorbed by the material particles used. Noteworthy examples are a $CO_2$-laser, an Nd:YAG-laser or a UV-laser. The power output of the laser may be continuous or pulsed, wherein the power density of the laser depends on the energy required for sufficiently heating the particles used.

In an advantageous embodiment, the solid oxide fuel cell element is manufactured by successively applying a series of layer sections with respectively different compositions of the ceramic material such that a single-piece element with different ceramic materials results. In the manual manufacture of tubular solid oxide fuel cells of a ceramic material, only individual compositions of a ceramic material are preferably used for the component-by-component manufacture, wherein the components are then connected to one another and subsequently cooperate. However, the method according to the invention makes it possible to use a single-piece component with completely different compositions of a ceramic material in successive layers during the layer-wise buildup of the solid oxide fuel cell element. The individual areas of different compositions form a single element without joints and connections.

When using different compositions, it would be possible, for example, to manufacture several components or subcomponents of a solid oxide fuel cell element according to an embodiment of the invention in a powder bed or by successively applying material with the aid of nozzles, wherein the material is changed after the completion of individual sintered areas and the raw component is either placed into a new powder bed or acted upon with a different material by means of the nozzles.

In order to realize the functions of an anode, a cathode and an electrolyte, it is sensible to utilize at least a first composition, a second composition and a third composition of the ceramic material. The first composition for anodes is composed, in particular, of a mixture of yttrium-doped zirconium dioxide and nickel. The use of strontium-doped lanthanum manganate appears sensible for cathodes. A solid ceramic material that is able to conduct oxygen ions, but has an insulating effect on electrons such as, e.g., yttrium-doped zirconium dioxide may be considered for the manufacture of electrolytes.

In a particularly advantageous embodiment, an arrangement of anodes and cathodes that have the shape of a ring or ring segment and are spaced apart from one another and intermediate electrolytes is produced, wherein the arrangement is enclosed by a radially inner casing and a radially outer casing, and wherein the anodes are manufactured of a first composition, the cathodes are manufactured of a second composition and the rings are manufactured of a third composition of the ceramic material. In this case, the inner casing represents a shaft tunnel of sorts that is ideally realized in the shape of a ring or ring segment while the outer casing forms a housing structure in order to protect the fuel cells formed by the anodes, the cathodes and the intermediate electrolytes. The two casings furthermore serve for absorbing mechanical loads and, in particular, for mounting the solid oxide fuel cell element within a drive unit.

In an advantageous embodiment, an anode of a first composition is connected to a nearest axially spaced-apart cathode of a second composition by means of a supporting structure that is manufactured with the aid of a conductive material such as, e.g., a conductively doped ceramic or ceramic-based material, a metallic material or another conductive substance or substance mixture featuring conductive particles, wherein the respective anode and the respective cathode do not enclose a common electrolyte. In this way, it is possible to serially connect individual fuel cells with the shape of a ring or ring segment that are respectively manufactured of anodes with the shape of a ring or ring segment, cathodes with the shape of a ring or ring segment and intermediate electrolytes, wherein a supporting structure produces a mechanical and electrically conductive connection between such fuel cells with the shape of a ring or ring segment, and wherein the anode of a fuel cell is respectively connected to the cathode of an adjacent fuel cell.

If sufficient structural space is available, it would also be conceivable to realize a parallel connection of several fuel cells with the shape of a ring or ring segment that are arranged concentric to one another and differ with respect to their radii. Several series-connected fuel cells may form rows or stacks of fuel cells that in turn are connected to one another in parallel. The reliability and the attainable current intensity therefore can be increased.

In an advantageous embodiment, at least one supporting structure is respectively arranged on the end regions of the solid oxide fuel cell element to be manufactured in order to produce an electrically conductive connection with covers that can be fixed on the end regions. In this way, the installation of electric lines can be eliminated and the mechanical structure is simplified. In addition, several fuel cells or fuel cell stacks that are arranged concentric to one another can also be connected in parallel.

In an equally advantageous embodiment, two, three, four or more groups of layer sections with at least one anode of a first composition, at least one electrolyte, at least one cathode of a second composition and at least one air duct or channel structure are strung together at least sectionally in a radial extension and at least sectionally in an axial extension. A successive manufacture of the solid oxide fuel cell element is realized by alternately arranging these layer sections, e.g., by changing the material, by changing the powder bed or the like.

In an equally advantageous embodiment, the solid oxide fuel cell element is manufactured rotationally symmetrical about a center axis, wherein an opening that is surrounded by layer sections with the shape of a ring or ring segment is directly produced along the center axis. The rotational symmetry leads to a more compact design and a simple integration into a drive unit as described in the German patent application with filing number DE 10 2011 018 448.1.

In a particularly advantageous embodiment, the thickness of the layer section lies in the range between 4 and 500 μm, preferably between 10 and 200 μm, particularly between 50 and 100 μm, such that particularly high precision can be achieved in the manufacturing process.

In an advantageous embodiment, a heat treatment is carried out by respectively heating the ceramic material used to a predefined temperature. For example, the heating to a predefined temperature may take place with consideration of an advantageous rise in temperature. Once the final temperature is reached, for example, it can be maintained for a predefined period of time and ultimately lowered again at a desired rate. The heat treatment essentially serves for converting the structure of the solid oxide fuel cell element being manufactured in such a way that particularly advantageous material properties result.

Another aspect relates to the solid oxide fuel cell element wherein a solid oxide fuel cell element is manufactured with the above-described method. In a particularly advantageous embodiment of the invention, the solid oxide fuel cell element comprises an arrangement of concentrically arranged anodes and cathodes with the shape of a ring or ring segment that are spaced apart from one another and enclosed by a radially inner casing and a radially outer casing. In this case, the anodes are manufactured of a first composition and the cathodes are manufactured of a second composition of ceramic material.

BRIEF DESCRIPTION OF THE DRAWINGS

Other characteristics, advantages and potential applications of the present invention result from the following description of the exemplary embodiments and the figures. In this respect, all described and/or graphically illustrated characteristics form the object of the invention individually and in any combination, namely regardless of their composition in the individual claims or their references to other claims. In the figures, identical or similar objects are furthermore identified by the same reference symbols.

DETAILED DESCRIPTION

Figure 1:
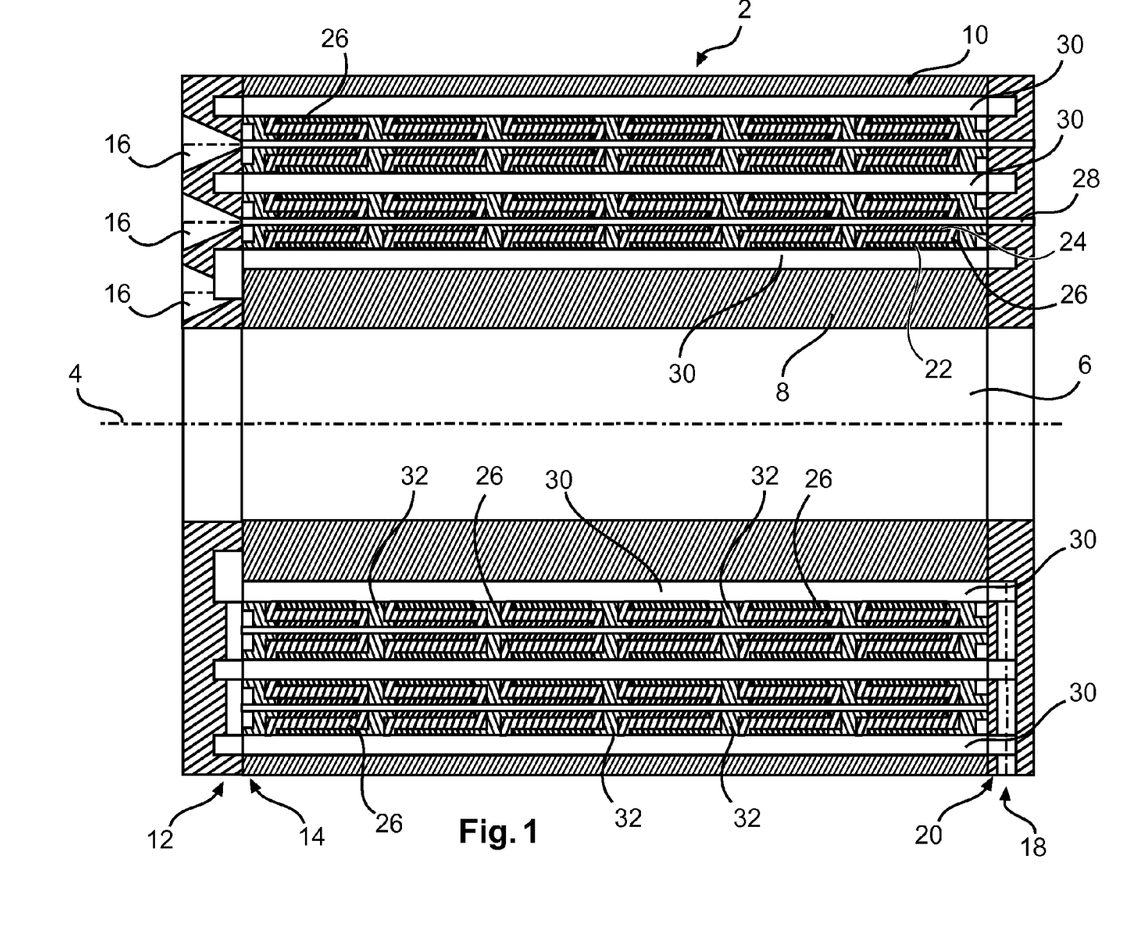
FIG. 1 shows a schematic lateral section of a solid oxide fuel cell element.

FIG. 1 shows a solid oxide fuel cell element 2 that is realized rotationally symmetrical about a center axis 4 and comprises an opening in the form of a shaft tunnel 6 that is defined by a radially inner casing 8 with the shape of a ring or ring segment. A radially outer casing 10 that preferably also has the shape of a ring or ring segment defines the outside of the solid oxide fuel cell element 2. In the plane of projection, a first cover 12 is illustrated on the left side and a second cover

18 is illustrated on the right side. The first cover is arranged on an inlet side 14 of the solid oxide fuel cell element 2 and designed for routing compressed air from a not-shown compressor that is arranged even father toward the left in the plane of projection into the solid oxide fuel cell element 2. To this end, exemplary funnel-shaped air inlet openings 16 that are tapered toward the solid oxide fuel cell element 2 are illustrated in the figure.

The second cover 18 is arranged on the outlet side of the solid oxide fuel cell element 2 and directed toward a not-shown combustion chamber that is adjacently arranged farther toward the right in the plane of projection and connected to a turbine. An unconsumed fuel-air mixture flows through the solid oxide fuel cell element 2 and is introduced into the downstream combustion chamber for combustion such that a turbine arranged downstream of the combustion chamber is set in rotation and drives a compressor arranged in front of the first cover 12 via a shaft extending through the shaft tunnel 6.

An arrangement of anodes 22 and cathodes 24 that are respectively provided in pairs is situated within the available structural space between the inner casing 8 and the outer casing 10, wherein electrolytes 26 are arranged between the anodes and the cathodes. The sectional representation of a rotationally symmetrical solid oxide fuel cell element 2 elucidates that the anodes 22 and the cathodes 24 respectively also have the shape of a ring or ring segment that concentrically extends about the central axis 4.

The electrolytes 26 preferably consist of a composition of a ceramic material that is able to conduct oxygen ions, but has an insulating effect on electrons. For example, yttrium-doped zirconium dioxide is a suitable material for this purpose. The cathodes 24 also consist of a composition of a ceramic material, particularly of strontium-doped lanthanum manganate that is conductive for ions and electrons. The anodes 22 are preferably manufactured of a mixture of yttrium-doped zirconium dioxide and nickel such that ions and electrons can be conducted.

The cathodes 24 are the elements of a solid oxide fuel cell that usually come in direct contact with the oxygen required for the fuel cell process. This is the reason why several air ducts 28 extending to the air inlet openings 16 are provided in the solid oxide fuel cell element 2. In order to reduce the number of air ducts 28 and air inlet openings 16, the cathodes 24 of two adjacent pairs of anodes 22 and cathodes 24 are respectively directed toward an air duct 28. In order to ensure a balanced supply of oxygen, a plurality of air ducts 28 are distributed over the entire cross section in a preferably symmetric arrangement or the air ducts 28 are altogether realized in the form of recesses that also have the shape of a ring or ring segment and respectively extend over an entire circumference.

In order to increase the attainable electrical power with an even more compact design, the solid oxide fuel cell element 2 comprises several pairs of anodes 22 and cathodes 24 such as, for example, four arrangements of this type on a radial plane, wherein one air duct is respectively required at a radial position for two such arrangements. It is furthermore preferred that several arrangements of this type are axially strung together in a row, wherein the respective air ducts 28 completely extend through the entire solid oxide fuel cell element 2.

The covers 12 and 18 can be used for spatially fixing the part of the solid oxide fuel cell element 2 situated between exemplary air ducts 28 with the shape of a ring or ring segment such that the air ducts 28 have a constant clear width and damages due to vibrations and the like can also be precluded. A sufficient mechanical stability is also achieved with supporting structures 32 that respectively extend axially from cathodes 24 to adjacent anodes 22 on the same side of the respective air channel 28 in the exemplary embodiment shown. The supporting structures 32 are manufactured with the aid of a conductive material such as, e.g., a conductively doped ceramic or ceramic-based material, a metallic material or another conductive substance or substance mixture having conductive particles such that individual pairs of anodes 22 and cathodes 24 with intermediate electrolytes 26 are axially connected in series between the covers 12 and 18 and several arrangements of such series connections are radially connected in parallel by the covers 12 and 18. The generated voltage can be tapped at the covers 12 and 18.

Channel structures 30 that extend along the entire longitudinal axis 4 and are respectively in contact with the anodes 22 are used for routing the fuel gas to the anodes 22. The respective surface enclosed between the anodes 22 and the cathodes 24 represents the active surface for the fuel cell process. The channel structures 30 may be entirely realized in the form of one or more recesses that, for example, are sectionally penetrated by supporting webs or manufactured in the form of more complex three-dimensional lattice structures that extend centrally between the air ducts 28, as well as directly adjacent to the inner casing 8 and the outer casing 10, and through which the gas can flow freely.

Figure 2:
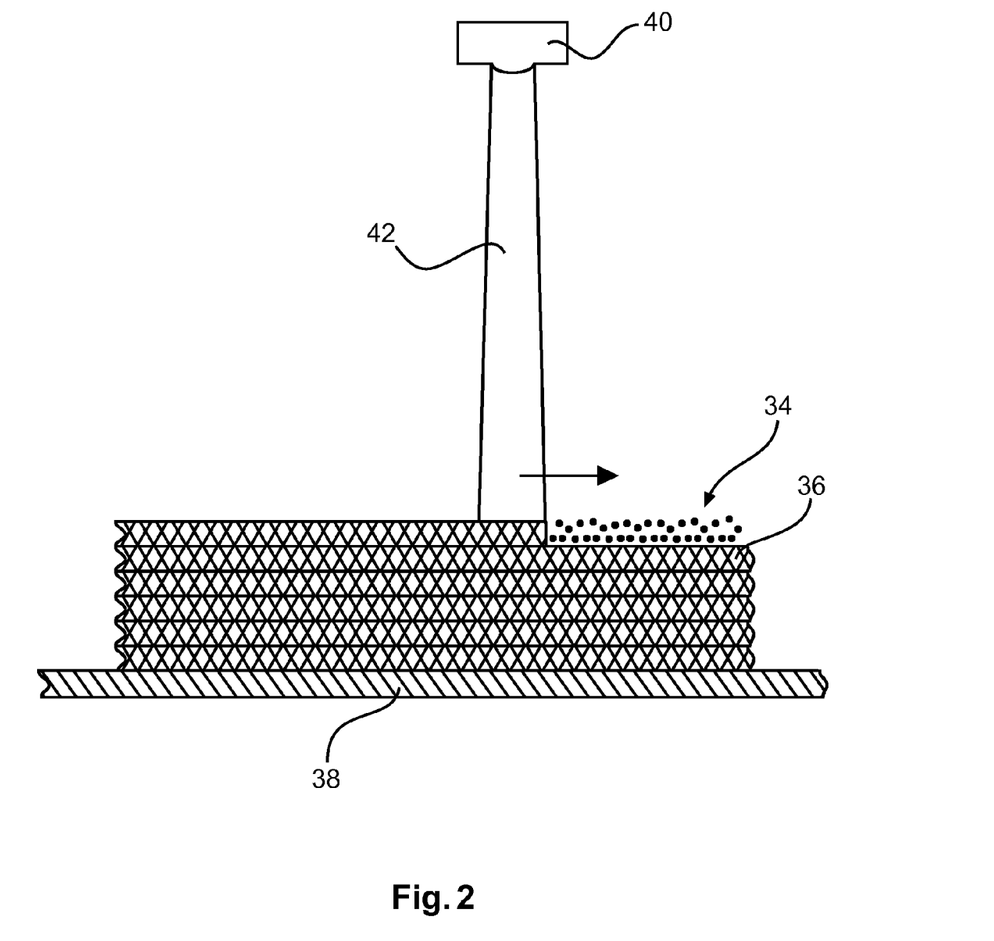
FIG. 2 shows a schematic representation of a first exemplary embodiment of a method according to the invention.

FIG. 2 shows a schematic representation of the method according to an aspect of the invention. A powder bed 34 in the form of an arrangement of particles of a ceramic material with suitable composition is locally applied onto a base layer 36 that, for example, represents a layer of the solid oxide fuel cell element 2 that was manufactured last. If the method for manufacturing a solid oxide fuel cell element is just beginning, the base layer consists of a backing 38 or the like. A movable heat source 40, e.g., in the form of a laser generates a beam 42 that locally heats the particles of the powder bed 34, as well as of the base layer lying underneath the powder bed on at least its surface. Due to this process, the particles connect to one another and a hardened layer section is produced. Excess powder can either remain on the base layer 32 or is removed with suitable means such as brushes or an air jet. The successive manufacture of several layer sections makes it possible to build up a solid oxide fuel cell element 2 with any shape. In this case, the heat source 40 is continuously moved over the surface of the base layer along the desired geometry.

Since the fuel cell element 2 to be manufactured consists of several different compositions of a ceramic material in order to realize different functions, layer sections with a first composition can be produced up to a certain extent or up to a height that comprises an undercut and subsequently supplemented with layer sections that should have a different composition after changing the powder bed. This can be repeated until the solid oxide fuel cell element 2 according to FIG. 1 is finished.

The powder bed on the base layer can preferably be metered out with the aid of a not-shown doctor blade or a (not-shown) spatula that moves over the base layer at a predefined distance therefrom. The particulate material is preferably dispensed by a nozzle or another suitable device, wherein the layer thickness lies in the range between 4 and 500 μm, preferably between 10 and 200 μm, particularly between 50 and 100 μm.

Figure 3:
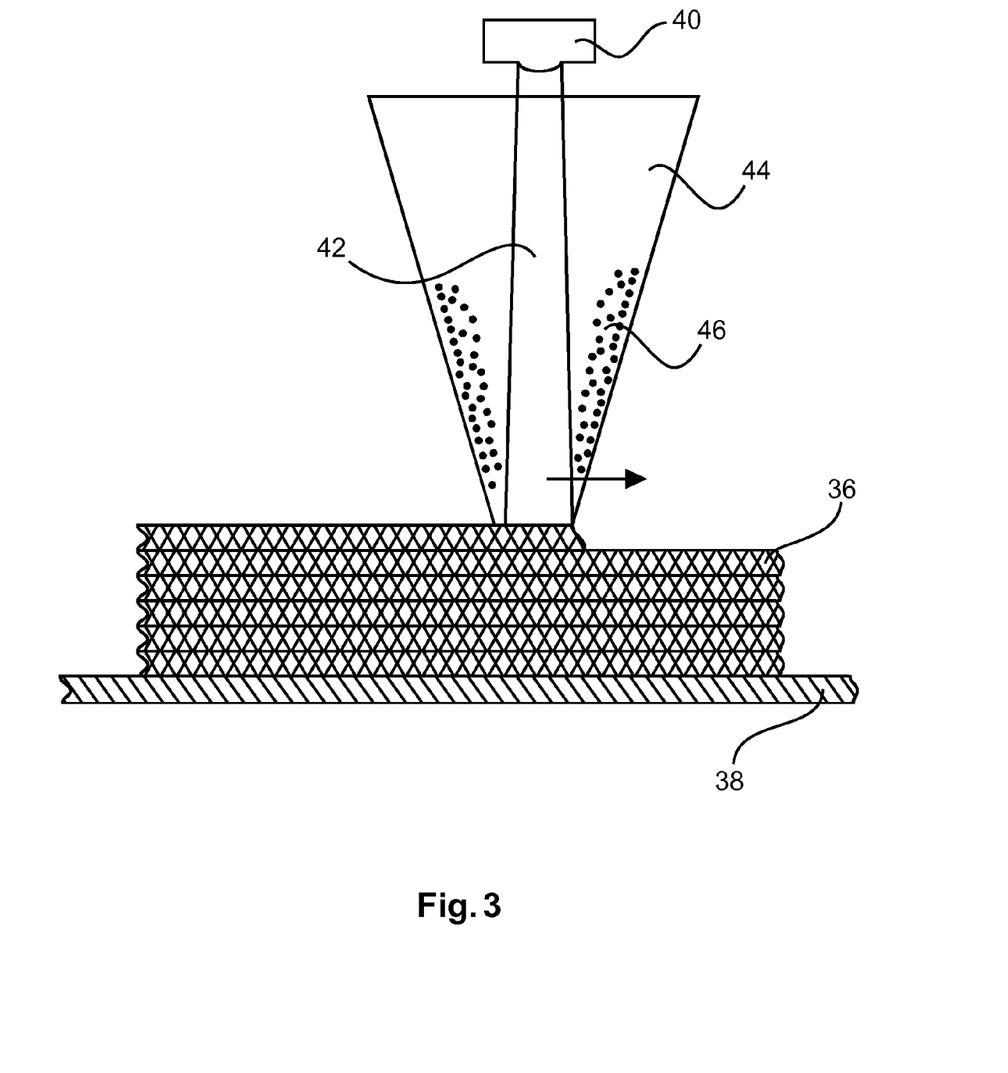
FIG. 3 shows a schematic representation of a second exemplary embodiment of a method according to the invention.

FIG. 3 shows a different approach, in which a nozzle 44 dispenses a particulate ceramic material 46 that is then immediately subjected to heat, i.e., simultaneously with the dispensing of material or in a recently applied section of the powder bed, in order to carry out a sintering process and thusly obtain ceramic. The arrangement consisting of the nozzle 44 and the heat source 40 can be continuously displaced over the surface of the base layer 36 in order to achieve a desired geometry.

As a supplement, it should be noted that "featuring" does not exclude any other elements or steps, and that "a" or "an" does not exclude a plurality. It should furthermore be noted that characteristics that were described with reference to one of the above exemplary embodiments can also be used in combination with other characteristics of other above-described exemplary embodiments. Reference symbols in the claims should not be interpreted in a restrictive sense.

The invention claimed is:

1. A method for manufacturing a solid oxide fuel cell element by layer-wise buildup, wherein at least one section of the solid oxide fuel cell element is built up by carrying out a step that at least comprises the following at least once:
    applying a layer section of a particulate ceramic material with predefined dimensions onto a base layer in a predefined area; and
    heating the layer section by a heat source such that the particles of the ceramic material connect to one another within the predefined dimensions,
    wherein two, three, four or more layer section groups are strung together at least sectionally in a radial extension and at least sectionally in an axial extension, each layer section group including at least one anode of a first composition, at least one electrolyte, at least one cathode of a second composition and at least one air duct or channel structure.

2. The method of claim 1, wherein the application of the layer section onto the base layer includes one of the following steps 1) or 2) that respectively comprise:
    providing a powder bed of ceramic particles on the base layer and sintering the particles in a section of the powder bed with predefined dimensions by a heat source such that the particles connect to one another within the predefined dimensions, as well as subsequent cooling; and
    supplying ceramic particles onto a predefined area of the base layer by one or more nozzles and sintering the particles by a heat source such that the particles connect to one another within the predefined dimensions, as well as subsequent cooling.

3. The method of claim 1, wherein at least one additional layer section of the particulate ceramic material is applied onto the base layer comprising a previously applied layer section.

4. The method of claim 1, wherein the heat source is movable and the application of a layer section is carried out under continuous or pulsating power output of the heat source until a predefined dimension of the layer section is reached.

5. The method of claim 1, wherein the solid oxide fuel cell element is manufactured by successively applying a series of layer sections with different compositions of a ceramic material such that a single-piece element with different ceramic materials results.

6. The method of claim 5, wherein a first composition of the ceramic material for manufacture of anodes contains a mixture of yttrium-doped zirconium dioxide and nickel.

7. The method of claim 6, wherein a second composition of the ceramic material for manufacture of cathodes contains strontium-doped lanthanum manganate.

8. The method of claim 7, wherein a third composition of the ceramic material for manufacture of electrolytes contains yttrium-doped zirconium dioxide.

9. The method of claim 1, wherein an arrangement of anodes and cathodes having a shape of a ring or ring segment and spaced apart from one another and intermediate electrolytes is produced;
    wherein the arrangement is enclosed by a radially inner casing and a radially outer casing; and
    wherein the anodes are manufactured of the first composition, the cathodes are manufactured of the second composition and the casings are manufactured of a third composition of the ceramic material.

10. The method of claim 1, wherein an anode of a first composition is connected to a nearest axially spaced-apart cathode of a second composition by a supporting structure manufactured with the aid of a conductive material, wherein the respective anode and the respective cathode do not enclose a common electrolyte.

11. The method of claim 10, wherein at least one supporting structure is respectively arranged on the end regions of the solid oxide fuel cell element to be manufactured to produce an electrically conductive connection with covers that is fixable on the end regions.

12. The method of claim 1, wherein the solid oxide fuel cell element is manufactured rotationally symmetrical about a center axis, wherein an opening surrounded by layer sections with the shape of a ring or ring segment is directly produced along the center axis.

13. The method of claim 1, wherein the thickness of the layer section lies in the range between 4 and 500 µm.

14. A single-piece solid oxide fuel cell element that is manufacturable with the method of claim 1.

15. A method for manufacturing a solid oxide fuel cell element by layer wise buildup, wherein at least one section of the solid oxide fuel cell element is built up by carrying out a step that at least comprises the following at least once:
    applying a layer section of a particulate ceramic material with predefined dimensions onto a base layer in a predefined area; and
    heating the layer section by a heat source such that the particles of the ceramic material connect to one another within the predefined dimensions,
    wherein an arrangement of anodes and cathodes having a shape of a ring or ring segment and spaced apart from one another and intermediate electrolytes is produced;
    wherein the arrangement is enclosed by a radially inner casing and a radially outer casing; and
    wherein the anodes are manufactured of a first composition, the cathodes are manufactured of a second composition and the casings are manufactured of a third composition of the ceramic material.

16. The method of claim 15, wherein the application of the layer section onto the base layer includes one of the following steps 1) or 2) that respectively comprise:
    providing a powder bed of ceramic particles on the base layer and sintering the particles in a section of the powder bed with predefined dimensions by a heat source such that the particles connect to one another within the predefined dimensions, as well as subsequent cooling; and
    supplying ceramic particles onto a predefined area of the base layer by one or more nozzles and sintering the particles by a heat source such that the particles connect to one another within the predefined dimensions, as well as subsequent cooling.

17. The method of claim 15, wherein at least one additional layer section of the particulate ceramic material is applied onto the base layer comprising a previously applied layer section.

18. The method of claim 15, wherein the heat source is movable and the application of a layer section is carried out under continuous or pulsating power output of the heat source until a predefined dimension of the layer section is reached.

19. The method of claim 15, wherein the solid oxide fuel cell element is manufactured by successively applying a series of layer sections with different compositions of a ceramic material such that a single piece element with different ceramic materials results.

20. The method of claim 15, wherein the thickness of the layer section lies in the range between 4 and 500 μm.

* * * * *